March 29, 1938. L. D. MILLS ET AL 2,112,299
ORE TREATMENT PROCESS
Original Filed April 24, 1935   2 Sheets-Sheet 1
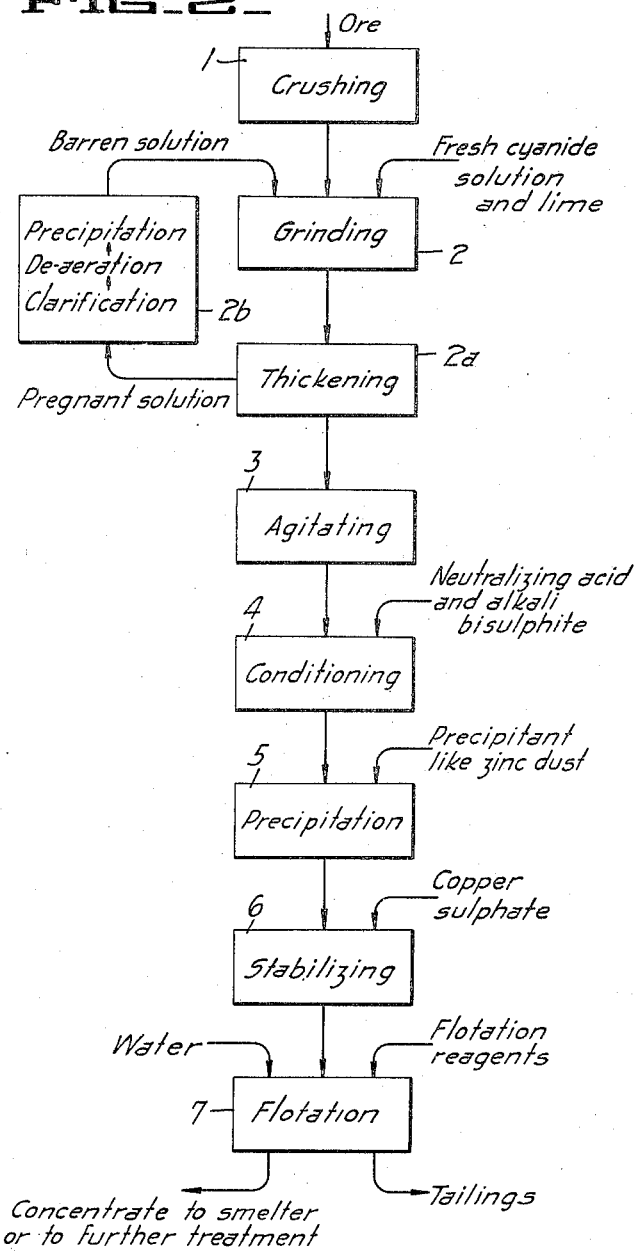
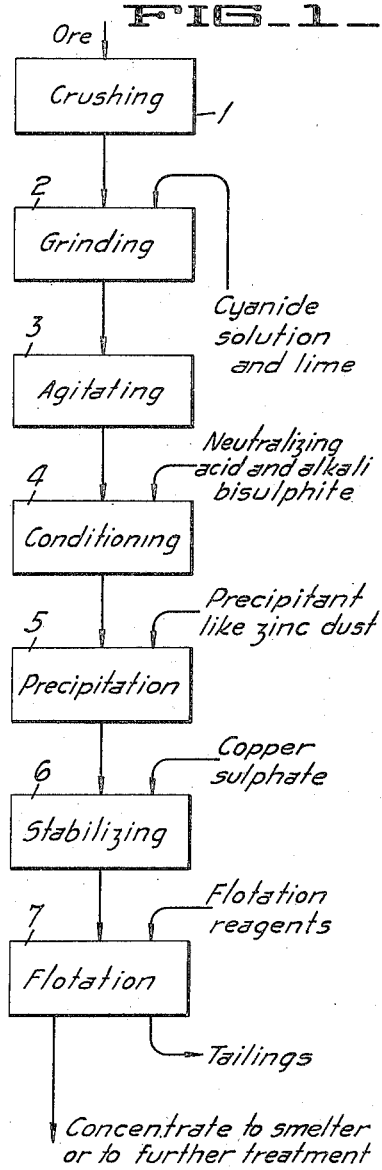
INVENTORS
LOUIS D. MILLS
THOMAS B. CROWE
JOYE C. HAUN
BY
Paul D. F. ____
ATTORNEY.

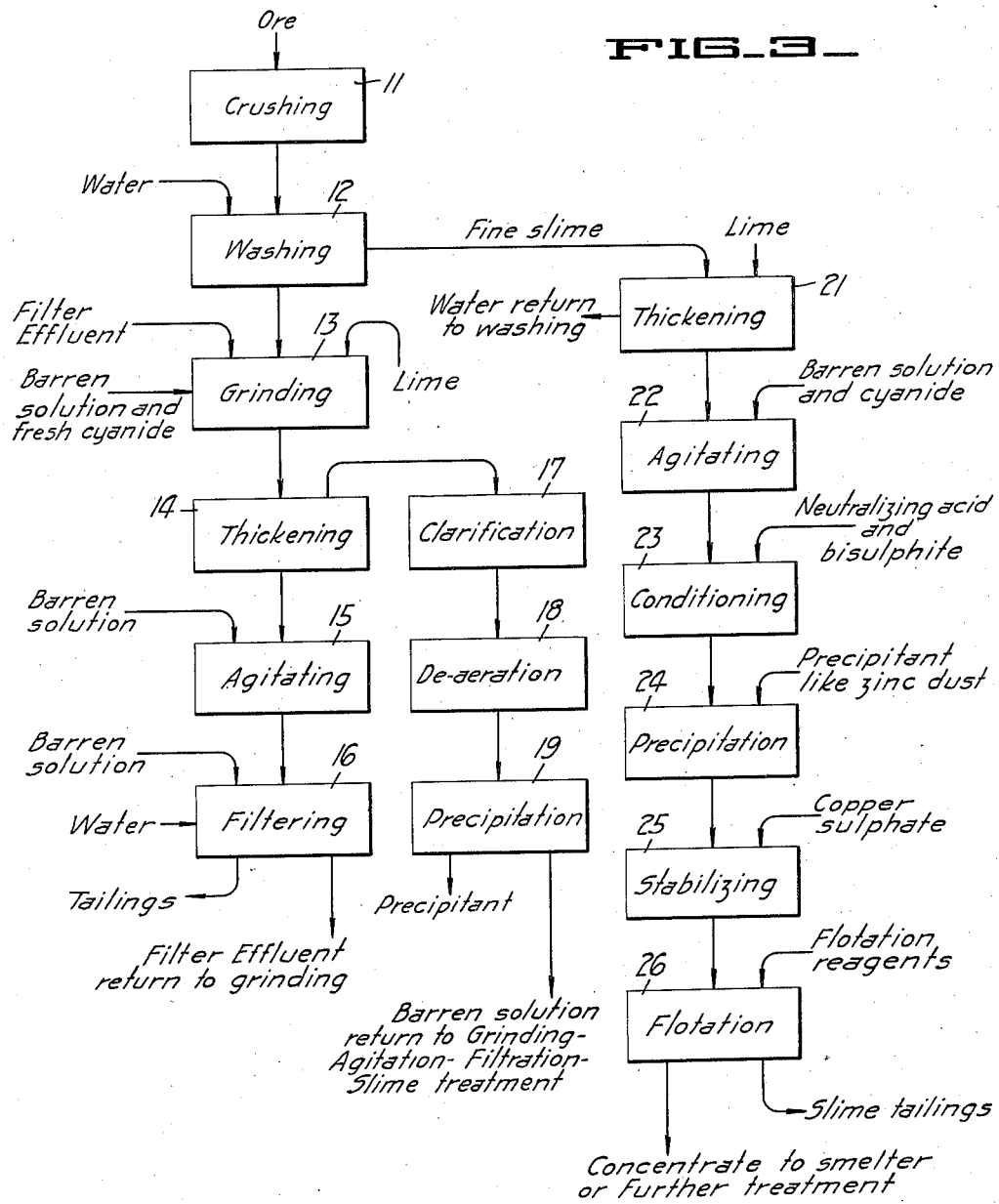

Patented Mar. 29, 1938

2,112,299

UNITED STATES PATENT OFFICE 2,112,299

ORE TREATMENT PROCESS

Louis D. Mills and Thomas B. Crowe, Palo Alto, and Joye C. Haun, San Francisco, Calif., assignors to The Merrill Company, San Francisco, Calif., a corporation of California Application April 24, 1935, Serial No. 17,992
Renewed December 27, 1937

10 Claims. (Cl. 75—2)

This invention relates generally to metallurgical processes used for the recovery of metals from ores. It has particular application where it is desired to recover gold and/or silver in varying proportions, although in some instances copper may be present and may be recovered together with the precious metals. As will be presently explained, the process utilizes both cyanidation and flotation concentration operations.

As is well known, conventional cyanidation processes employ aqueous solutions of alkaline cyanide, such as sodium, potassium or calcium cyanides, to dissolve metals from ore which has been ground sufficiently fine to permit the solvent to properly contact the metal particles or mineral particles containing them. Following dissolution of the metals, the aqueous solvent is separated from the ore and further treated or precipitated to recover the contained metals. Precipitation is generally effected by contacting the clarified solution with metallic zinc, usually in the form of zinc dust.

Certain ores, particularly those which are oxidized or weathered, and therefore somewhat porous, yield their contained metals to the solvent at comparatively coarse meshes. Such ores are amenable to leaching in shallow open tanks, thus providing a cheap and convenient method for contacting the ore with the solvent and for separating the resultant solution containing the metals which are to be finally recovered by precipitation. However, ores of such a character are comparatively rare. The majority of ores require fine grinding, frequently to 200 mesh (65 microns), or even to 400 mesh (30 microns), in order to obtain effective dissolution of the metals by cyanide. In treating such ores, after grinding, preliminary thickening, and agitation or dissolution have been completed, the pulp is again settled or thickened to remove a portion of the solution, and is then passed to filters where the final separation of the solution from the tailings is completed. As an alternative to thickening and washing on filters, the metal-bearing solution may be displaced, and the tailings washed by barren or precipitated solution and water in a series of thickeners through which the washing solutions pass in countercurrent flow to passage of the pulp. In either case, the recovered solution, or a suitable proportion thereof, is clarified and precipitated with zinc in the manner already described.

With respect to many precious metal ores of reasonably good or relatively high assay value, the above-described procedure constitutes an admirable process and will yield efficient and economical results. However, there are other types of ores to which such a procedure is not suited. One such type contains considerable amounts of clay, talc or like slime components. With such an ore, the successive steps of primary thickening, agitation, secondary thickening and filtering or washing, become difficult and require excessively large and expensive equipment, due to the hindrance to settlement and filtration caused by the presence of the clay or similar material. Another type of ore, which cannot be economically or conveniently treated by conventional cyanidation, includes deposits which are relatively low in assay value, such as residues from previous metallurgical operations. In such instances, recovery or retreatment is frequently prevented by the prohibitive construction and operating costs of conventional milling and cyanidation equipment, even though slime components may not be present to a detrimental degree.

Concentration processes other than cyanidation, such as flotation concentration, are of themselves seldom applicable to the efficient recovery of gold and silver from their ores. Many ores frequently contain oxidized or tarnished mineral particles which resist flotation, and frequently contain variable amounts of extremely fine precious metal particles attached to the gangue particles, which are not effectively recovered by flotation but which are attacked and subsequently dissolved by cyanide solution.

In view of the foregoing, it is an object of the invention to provide a recovery process which can be successfully applied to ores and deposits of the character described above which offer difficulties to conventional milling processes, and which in many instances may advantageously displace conventional cyanidation and flotation processes with substantial savings in grinding, leaching and other milling operations.

Another object of the invention is to provide a new recovery process which in many instances will make possible economies in installation, maintenance and operation, as compared with prior processes.

Another object of the invention is to provide a novel process utilizing both cyanidation and flotation concentration operations in the recovery of precious metal values.

Further objects of the invention will appear from the following description in which certain embodiments of the invention have been set forth in detail in conjunction with the accompanying drawings.

Referring to the drawings, Figs. 1, 2 and 3 are flow sheets illustrating diagrammatically different embodiments of the present process.

In general, the present process consists in contacting the ground ore with cyanide solution to dissolve the readily soluble metals, and then adding a precipitant such as divided zinc or zinc dust to the pulp to precipitate the dissolved metals, after which the pulp is subjected to flotation to recover the precipitated metals and such other floatable minerals as justify further treatment. (The term "pulp", as employed herein, includes a mixture of all or part of the ground ore and the cyanide solution.) Such a procedure involves peculiar difficulties. For example, the dissolved metals in such a pulp cannot be completely or effectively precipitated in the pulp by conventional methods of precipitating pregnant cyanide solutions. Likewise, after obtaining a pulp containing precipitated values, direct application of a flotation operation causes partial resolution of the precipitate during the violent aeration and agitation in the flotation machine.

In the present process the pulp is subjected to a conditioning operation which, in addition to deoxidizing the solution, affords a solvent for zinc and also causes the solution to be made substantially neutral, after which the dissolved metals can be completely and efficiently precipitated in the pulp by the addition of a precipitant like zinc dust, irrespective of the presence of slime or other solid components of the comminuted ore. In an alkaline cyanide solution, the presence of slime, formed mainly from the clay and talc components of the ore, seriously impedes precipitation, since the slime particles tend to coagulate or aggregate about particles of the metallic precipitant to retard the rate of precipitation. It has been observed that with a neutral solution the finely divided particles of slime are dispersed and therefore do not hold the solution in mechanical entrainment or offer an impediment to complete precipitation.

With respect to re-solution of precipitated metals, it has been found that this can be completely prevented by the addition of a metal salt, such as copper sulphate, in quantities sufficient to combine with all the existing cyanogen precious metal solvents, and to leave a slight excess in free solution. Therefore, prior to the flotation operation the pulp is subjected to a stabilizing operation in which a reagent such as copper sulphate is added, after which it is possible to float off substantially all of the precipitated metals and such floatable mineral portions of the ore as justify further treatment.

A description of the process represented by Fig. 1 of the drawings is as follows:—Step 1 represents preliminary crushing of the precious metal bearing ore. Step 2 represents grinding of the ore, together with cyanide solution having sufficient extracting power to effectively dissolve the readily soluble precious metals. According to conventional practice, protective alkalinity is afforded by additions of lime. After grinding to suitable fineness, the pulp is subjected to retention together with agitation at 3, until the readily soluble precious metals are dissolved. The pulp is then subjected to conditioning operation 4, to place it in proper condition for precipitation by the addition of a metallic precipitant.

As will be presently explained in greater detail, conditioning of the pulp can be carried out by a number of different procedures. For the present it will suffice to state that the pulp can be conditioned by neutralizing alkalinity of the cyanide solution with an acid, such as sulphuric acid, after which an alkali bisulphite, such as sodium or calcium bisulphite, is added. When so treated, the solution of the pulp assumes a hydrogen ion concentration between pH values of 6 and 8.4 (as expressed in Sørensen's units), and the hydrogen ion concentration is maintained substantially constant during the subsequent precipitating operation because of the presence of alkali bisulphite in free solution.

The precipitating operation 5 is carried out under conditions of continual agitation, with the introduction of a suitable metallic precipitant such as zinc dust. After effective precipitation of the dissolved metals, the pulp is subjected to a stabilizing operation 6, to prepare it for the subsequent flotation operation 7. As previously stated, the stabilizing operation is for the purpose of destroying such cyanogen compounds as may be solvents for precipitated precious metals, which compounds if not destroyed or inhibited would tend to re-dissolve precious metals in the flotation operation. Introduction of copper sulphate as a stabilizing reagent is indicated for step 6 in Fig. 1. Other soluble metallic salts can be utilized, such as mercurous chloride or like mercury salts.

In the flotation operation 7, suitable reagents are employed, such as are commonly used in operations of this character, as for example pine oil, xanthates, and the like. The flotation concentrate obtained includes precipitated metals, together with such precious metals or precious metal containing minerals as have not initially dissolved in the cyanide solution, either because of mechanical entrainment with other materials or because of the nature of the chemical compounds in which they may be present. The tailings from the flotation operation may be either discarded or permitted to settle and the effluent again employed in the process.

In the above description of Fig. 1 it has been presumed that the ore being treated is such as requires crushing and grinding in order to insure proper contact with cyanide solution to effectively dissolve metals. Where the ores or precious metal bearing deposits to be treated are already in a comparatively fine state of subdivision, the steps of crushing and grinding may be eliminated, and the ore and cyanide solution, after mixing or pulping, introduced directly to the agitating operation. As a specific example of such practice, reference is made to the retreatment of tailings from previous cyanidation operations which can be readily pulped without crushing and grinding. Such deposits usually contain some residual cyanide or cyanogen compounds, together with precious metal values which may be combined with cyanide or may be in the form of minerals from which the gold is not readily leachable by cyanide solution, or both. Frequently it will suffice to pulp such an ore with fresh water to afford dissolved values for precipitation, since a precipitation operation of the character described can be effectively carried out irrespective of the amount of cyanide present. In other instances, small amounts of cyanide can be added, as an aid in effecting extraction. Since flotation of the pulp can be relied upon to recover precious metal values which have not been dissolved in the cyanide solution, in addition to precipitated metals, it is apparent that the agitation and retention can be minimized, with a resultant saving in the cost of recovery.

Aside from enabling efficient precipitation in a pulp, the conditioning operation serves to remove traces of oxygen, which is known to be desirable for complete precipitation of gold and silver, and a solvent is afforded for the zinc or like precipitant. The solvent action on the zinc is properly controlled, however, so that while precipitation occurs rapidly to completion, there is no excessive zinc consumption such as would occur in a solution appreciably acid. Thus, when utilizing an alkali bisulphite as previously specified, this chemical, aside from neutralizing any remaining alkalinity, serves to remove dissolved oxygen by virtue of its deoxidizing action, and it also affords a proper solvent for the zinc without occasioning formation of precipitation by-products tending to coat the zinc and thus retard precipitation.

With respect to alternative procedures which can be employed to condition the pulp prior to precipitation, it has been found that ferrous sulphate can be used in place of an alkali bisulphite. Likewise, by the use of additional amounts of ferrous sulphate or alkali bisulphite, either of these chemicals can be utilized to neutralize total alkalinity, in addition to furnishing a certain amount of such salts in free solution during the precipitating operation. Instead of neutralizing alkalinity by the use of an acid such as sulphuric acid, it is possible to effect neutralization of alkalinity by passing carbondioxide gas through the pulp. A neutralized and carbonated solution is properly conditioned for effective precipitation provided proper means is employed to insure absence of oxygen, as for example by having some sulphur dioxide gas blended with the carbon dioxide. Likewise, alkalinity can be neutralized by passing sulphur dioxide gas through the pulp, in which event the action automatically provides a bisulphite in the solution at the end of the neutralizing operation. In addition to the function just stated for chemicals such as sodium bisulphite, calcium bisulphite or ferrous sulphate, the presence of these compounds in free solution during the precipitating operation serves to maintain the hydrogen ion concentration of the solution substantially constant during precipitation, and in this connection the compounds act as buffer mediums.

In accordance with conventional practice, the zinc dust employed as a precipitant can be emulsified in water before being added to the pulp. It has also been found desirable to add a soluble lead salt, such as lead acetate or lead nitrate, to the emulsion. Such a reagent causes precipitation of metallic lead on the zinc particles, whereby the zinc is made more effective as a precipitant of precious metals, and also appears to aid subsequent flotation of precipitated values from the pulp.

Important characteristics of the process described with reference to Fig. 1 will be apparent. Since slime components from the ore are carried through the process, equipment for thickening and filtering the pulp, and for clarifying the solution prior to precipitation, can be omitted, with a substantial saving in installation, maintenance and operating costs. An advantageous feature of the process is that grinding and other milling operations can be simplified, in that the flotation operation may be relied upon to effect recovery of a substantial part of the gold and silver which is not rapidly dissolved by the cyanide solution. In other words, the ore may be ground to a lesser degree of fineness and/or can be subjected to a shorter period of contact with the cyanide solution, to effect extraction of only that portion of the precious metal values which is readily soluble, without materially sacrificing the effectiveness of ultimate recovery.

It has been pointed out, with reference to the re-treatment of low-grade tailings, that the process makes possible efficient precipitation irrespective of the amount of simple cyanide present. This feature can be utilized to advantage in the treatment of many natural low-grade ores, where dilute cyanide solutions can be employed, containing only sufficient cyanide to effectively extract the readily soluble gold and silver. In contrast to such practice, in conventional cyaniding processes sufficient cyanide must be maintained in the solution to obtain efficient precipitation by the methods previously employed, thus making it uneconomical to work low-grade ores when the cyanide consumption, in proportion to the recovery obtained, would be excessive. With the present process, in many instances cyanide solutions containing as little as 0.001% of sodium cyanide can be employed, as compared with 0.01% or more employed in prior practice.

The copper sulphate employed to prepare the solution for the flotation operation has a dual function in the process, since it not only prevents re-solution of precipitated values but also serves as an effective aid to flotation. Tests have shown that such a pulp, which has been previously subjected to conditioning, precipitating and stabilizing operations as described, is readily amenable to flotation, and that mineral sulphides, such as pyrites, which may carry precious metal values, are effectively removed in the concentrate. In this connection it may be noted that neutral condition of the pulp, with dispersion of any slime components, promotes effective flotation as well as facilitates effective precipitation within the pulp, since it avoids or minimizes occlusion of values in the slime. Likewise, immediately prior to the flotation operation, minerals or values to be floated off are subjected to deoxidizing conditions, because of the alkali bisulphite or like chemical present, which is frequently advantageous in floating oxidized or tarnished mineral sulphides.

While the process represented by Fig. 1 is particularly applicable to the treatment of simple, low-grade precious metal ores or tailings, where relatively weak cyanide solutions may be employed, the modification of Fig. 2 is adapted for treating more complex ores, particularly those requiring the use of stronger cyanide solutions to obtain economical extraction of the metals. The steps or operations, corresponding to the steps of Fig. 1, have been designated by like numerals. Following grinding of the ore with cyanide solution, the material is subjected to a thickening operation 2a, from which a majority of the pregnant solution is drawn off for separate treatment at 2b, to remove precious metals from the same. This treatment may be conventional in character, involving, for example, clarification of the solution, deaeration to remove dissolved oxygen, and introduction of zinc dust into the solution to precipitate the same, with flow of the solution through filter elements upon which precipitation is completed. The barren solution from this operation is supplied to the grinding operation 2. The pulp from the thickening operation 2a, which retains a minor part of the dissolved precious metals, is treated in accordance with the process as described in Fig. 1, that is, to agitation, conditioning, precipitation, stabilizing, and flotation.

If desired, the modification of Fig. 2 can be altered by the provision of a secondary thickening operation, following the agitation step 3. In this secondary thickening operation a portion of the barren solution from 2b can be utilized as a wash, with effluent from the secondary thickening operation being returned to the grinding operation 2. By means of this alternative, the rich cyanide solution from the grinding and agitating operations can be more effectively separated from the pulp which is subsequently delivered to the conditioning operation 4.

The modification of Fig. 3 differs from Figs. 1 and 2 in that the so-called slime components of the ore are treated apart from the coarser solid components. Thus, in this instance, after crushing at 11, the ore is subjected to a washing operation 12 in which finely divided slime components, such as clay or talc, are removed. The remaining solid components of the crushed ore, which can be separated out from the cyanide solution without undue difficulty or expense, are subjected to grinding at 13, together with cyanide solution. At 14 the ground material is subjected to a primary thickening operation, the effluent from which is conducted to clarifying, deaerating and precipitating operations 17, 18 and 19 respectively. These operations can be conventional in character, utilizing zinc dust, followed by flow of the solution through elements of a precipitating filter. The thickened pulp 14 is subjected to agitation at 15, together with additional solution, and is then subjected to a filtering operation 16 in which it is subjected to washing by barren cyanide solution and fresh water. The filter effluent from 16 is returned to the grinding operation 13. A part of the barren solution from the precipitating operation 19 is also utilized in the grinding operation 13 and in the agitating operation 15.

The slimes removed in the washing operation 12, for separate treatment, are subjected to a thickening operation 21, at which time lime can be added. Effluent from this thickening operation can be utilized as wash water in the washing operation 12. Thickened slimes or pulp from 21 are subjected to an agitating operation 22, at which time a portion of the barren solution from the precipitating operation 19 is added together with some fresh cyanide. After the agitating operation 22, in which soluble metals in the slime are dissolved, the material is subjected to the conditioning operation 23 and subsequently to the precipitating, stabilizing and flotation operations 24, 25 and 26 respectively. These operations 24, 25 and 26 correspond to the operations 4 to 7, inclusive, of Figs. 1 and 2.

It is evident that the process of Fig. 3 makes possible the use of cyanide solutions of conventional strength to recover precious metals from the coarser solid components of the crushed ore, which offer no unusual difficulties to cyanide treatment. The finer components of the ore are removed from the main cyanide circuit, which is thus simplified and rendered more efficient because such removed slime components of an ore usually contain elements which not only impede physical operation of the cyanide plant, but also, from a chemical standpoint, increase the consumption of chemicals such as lime and cyanide, and furthermore contain a preponderance of the elements of an ore which tend to foul the cyanide solutions and impede extraction of the metals.

A further feature is that a certain portion of the barren solution from 19 is continuously removed from the main cyanide circuit and utilized as a solvent in the secondary or slime circuit. The barren solution thus removed from the main cyanide circuit is replaced with fresh cyanide solution, thus maintaining the main solution circuit in fresh and active condition with resultant maximum dissolution of the precious metals.

In the foregoing, particular reference has been made to the recovery of gold and silver from ores and precious metal bearing deposits. It should be understood that the precipitation of gold and silver is accompanied by precipitation of copper, where this metal is dissolved from the ore.

In all of the embodiments described, where precipitated solution is subjected to flotation, the pulp includes either all of the comminuted solids of the ore, or the troublesome slime components, as in Fig. 3. It should be understood, however, that in some instances the invention may be applied to cyanide solutions which may not contain a large percentage of ore solids, but which may be cloudy or incompletely clarified. For example, by applying the present process, unclarified dam solutions may be treated directly to recover precious metals, without filtration or clarification of the solution.

Reference has been made to a suitable treatment of the flotation concentrate to recover the desired precious metals from the same. Such treatment may consist in regrinding the concentrates in strong cyanide solution, after which the reground concentrate is agitated until all of the precipitated values are in solution, and until substantially all of the precious metals contained in the mineral portions of the concentrates have been dissolved. Following this dissolution, the pulp is thickened and filtered to separate the precious metal bearing solution from the residue, which may then be discarded. The dissolved metals are recovered from this rich solution which normally would be highly alkaline and strong in cyanide, by conventional precipitation methods, or, in the case of the flow sheets of Figs. 2 and 3, the solution may be added to the solution overflowing from thickener 2a in Fig. 2, or to the solution overflowing from thickener 14 in Fig. 3.

Subject matter disclosed but not claimed herein is claimed in our co-pending application Serial Number 83,080, filed June 2, 1936.

We claim:

1. In a process for the recovery of precious metals like gold and silver from ores, forming a pulp consisting of comminuted ore solids and cyanide solution, adding a neutralizing reagent to the pulp, causing the neutralized solution of the pulp to be further conditioned by effecting removal of dissolved oxygen and by providing therein a solvent for a metallic precipitant, introducing a metallic precipitant into the pulp under conditions of agitation to effect precipitation of dissolved metals, introducing a reagent into the pulp after the precipitating operation, to destroy cyanogen solvents which would otherwise tend to re-dissolve precipitated metals, and then treating the pulp for effecting removal of a concentrate containing the desired precious metals.

2. In a process for the recovery of precious metals like gold and silver from ores, forming a pulp consisting of comminuted ore solids and cyanide solution, conditioning the pulp to enable efficient precipitation with a metallic precipitant, said conditioning operation including introduction of a chemical into the solution of the pulp to substantially neutralize the same and to afford a buffer medium tending to maintain the solution substantially neutral during precipitation, such conditioning operation further serving to afford a solvent for the metallic precipitant and a solvent for by-products which would otherwise tend to retard precipitation, effecting precipitation of dissolved precious metals by introducing a metallic precipitant into the pulp so conditioned, introducing into the solution a reagent serving to destroy cyanogen solvents which would otherwise tend to re-dissolve the precipitated precious metals, and then subjecting the pulp to a flotation operation for the removal of a flotation concentrate containing the desired precious metals.

3. In a process for the recovery of precious metals from ores, causing ore solids to form a pulp with cyanide solution, whereby the solution is caused to extract readily soluble precious metals, precipitating the precious metal in the pulp while the solution of the pulp is neutral, stabilizing the solution by destroying cyanogen solvents for the precious metals, and then subjecting the pulp to a flotation operation for the removal of a precious metal bearing concentrate.

4. In a process for the recovery of precious metals from ores, causing ore solids to form a pulp with cyanide solution, whereby the solution is caused to extract readily soluble precious metals, conditioning the solution of the pulp to cause the same to assume a hydrogen ion concentration between the limits of from pH 6 to 8.4 and to afford a solvent for a metallic precipitant, adding a metallic precipitant to the pulp under conditions of agitation, stabilizing the solution of the pulp by adding a metallic salt capable of destroying cyanogen solvents for the precious metals, and then subjecting the precipitated pulp to a flotation operation for the removal of precious metal bearing concentrate.

5. In a process for the recovery of precious metals from ores, causing ore solids to form a pulp with cyanide solution, whereby the solution is caused to extract readily soluble precious metals, neutralizing alkalinity of the solution of the pulp, adding an alkali bisulphite to the solution, adding zinc to the pulp so conditioned under conditions of agitation, adding copper sulphate to the precipitated solution to destroy solvents for the precious metals, and then subjecting the precipitated mass to a flotation operation to remove a precious metal bearing concentrate.

6. In a process for the recovery of precious metals from ores, causing the ore solids to form a pulp with cyanide solution, whereby the solution is caused to dissolve precious metals, removing a major part of the solution from the pulp in a thickening operation, effecting clarification and precipitation of said major part of the solution to recover precious metals dissolved in the same, subjecting the solution in the remaining pulp to a conditioning operation to neutralize the solution and to afford a solvent for a metallic precipitant, adding a metallic precipitant to the pulp while the pulp is being agitated whereby precious metals carried by the solution of the pulp are precipitated, adding a stabilizing reagent to the precipitated pulp to destroy cyanogen solvents for the precious metals, and then subjecting the stabilized pulp to a flotation operation to effect removal of a flotation concentrate.

7. In a process for the recovery of precious metals from ores, separating slime components from coarser components of the ore, treating the coarser components to cyaniding to effect recovery of precious metals in the same, pulping the slime components with cyanide solution to dissolve precious metals from the same, conditioning said last-named slime pulp to afford a hydrogen ion concentration between the limits of from pH 6 to 8.4 and to afford a solvent for a metallic precipitant, precipitating the solution without removal of slime components, by adding a metallic precipitant, adding a stabilizing reagent to the precipitated solution to destroy cyanogen solvents for precious metals, and then subjecting the slime pulp to a flotation operation for the removal of a flotation concentrate.

8. In a process for the recovery of precious metals from ores, crushing the ore, removing slime components from the crushed ore, subjecting the remaining coarser components to cyanidation for recovery of precious metals from the same, the cyanidation making available barren solution, pulping said slime components with said barren solution, precipitating said last named slime pulp while the solution of the same is neutral, while it contains a solvent for the precipitant and while it is devoid of oxygen, and then subjecting the precipitated slime pulp to a flotation operation for removal of a flotation concentrate.

9. In a process for the recovery of precious metals from ores, crushing the ore, removing slime components from the crushed ore, subjecting the remaining coarser components to cyanidation for recovery of precious metals from the same, the cyanidation making available barren solution, pulping said slime components with said barren solution, precipitating said last named slime pulp while the solution of the same is neutral, while it contains a solvent for the precipitant and while it is devoid of oxygen, adding a reagent to the precipitated slime pulp to destroy cyanogen solvents for precious metals, and then subjecting the precipitated slime pulp to a flotation operation for the removal of a flotation concentrate.

10. In a process for the recovery of precious metals from ores, forming a pulp consisting of comminuted ore solids and cyanide solution, adding divided zinc together with a soluble lead salt to the pulp, while the pulp is substantially neutral, while it is deoxidized, and while it contains a solvent for zinc, adding copper sulphate to the pulp, and then subjecting the pulp to a flotation operation.

LOUIS D. MILLS.
THOMAS B. CROWE.
JOYE C. HAUN.